3,311,556
COPOLYMERS OF ISOBUTENE AND 2-ALLYLOXYTETRAHYDROPYRAN

Cecil G. Brannen, Highland, and James A. Wuellner, Gary, Ind., assignors to Standard Oil Company, Chicago, Ill., a corporation of Indiana
No Drawing. Filed Dec. 28, 1964, Ser. No. 421,726
9 Claims. (Cl. 252—32.7)

This invention relates to novel copolymeric compositions. More particularly, it relates to copolymer compositions of isobutene and 2-allyloxytetrahydropyran, derivatives thereof, and to lubricants containing such compositions.

It is well known that copolymers produced by conventional polymerization techniques contain monomeric units which alternate regularly or at random in the copolymer chain. The properties of the copolymer will depend upon the particular monomers employed, and the relative concentrations of each monomer in the copolymer product. Thus, by judiciously selecting the monomers to be copolymerized, and by controlling their relative concentrations, copolymers having specific useful properties may be tailor-made to fit the needs of industry. In particular, copolymers useful as lubricants and lubricant additives may be manufactured.

Lubricating oils perform more effectively when chemical additives are combined with the lubricating oil. Among the more important properties of a lubricant ameliorated by additives, such as polymers and copolymers, is the viscosity index. An improved viscosity index results in a more uniform viscosity at the varying temperatures to which a lubricant is often subjected during use. Thus, a particularly advantageous means of improving the viscosity index of a lubricant is by adding to a base lubricant an oil-soluble copolymer, such as the copolymeric compositions of the present invention.

In recent years, lubricant manufacturers have directed their efforts toward multi-purpose lubricant compositions. A composition which performs multi-functions, such as improving the viscosity index, imparting detergency and dispersancy characteristics, and rust inhibition, reduces the number of additives required in a lubricant, and often proportionately reduces the cost without sacrificing quality.

The copolymers of this invention consisting essentially of the copolymerization product of polymerizable monomers (A) isobutene and (B) 2-allyloxytetrahydropyran, wherein the molar ratio of $A:B$ is 1–100:1, are a new class of copolymers that are especially useful per se as lubricant additives and as valuable chemical intermediates for the preparation of chemical compositions. An especially valuable derivative is the hydrolyzed copolymer for use as a lubricant additive and starting material for introducing other functional groups into the copolymer chain.

The molar ratio of monomer A to monomer B is of particular importance to the invention. Thus, for the copolymer per se to be utilized as a lubricant, it is desirable that the molar ratio of monomer A to monomer B be from about 5 to about 50:1 to produce an oil-soluble copolymer composition. A copolymer having about 25–35 isobutene units for each monomer B unit is preferred as a lubricant additive.

Polymerization techniques for polymerizing monomer A, isobutene(2-methylpropene), commonly referred to as isobutylene, and monomer B are known in the art. Cationic polymerization techniques employing a Lewis acid are preferred. Ziegler-type catalyst may also be advantageously employed. Typical Lewis acid catalysts suitable for copolymerizing copolymers of the present invention are $BF_3$, $BF_3$ etherate, aluminum chloride, and titanium chloride. An example of a suitable Ziegler catalyst is trialkyl aluminum and titanium chloride. From about 1 to 20 weight percent of the catalyst may suitably be used in polymerization.

Polymerization may be effected in bulk or solution, and a preferred method is solution polymerization. A typical solvent is heptane; however, most inert hydrocarbon solvents are suitable. A useful expedient is to employ a base lubricating oil as a solvent. Subsequent separation of the copolymer product from a solvent which would be incompatible with the base oil is thus avoided.

Polymerization may be carried out at temperatures from about $-100°$ F. to about $0°$ F. The molecular weight of the copolymer product is influenced by the polymerization temperature. Thus, the most advantageous polymerization temperature within the range will depend upon the desired molecular weight of the final product. A preferred temperature range for producing copolymers suitable for use as lubricant additives is about $-50°$ F. to about $-20°$ F. Polymerization may be accomplished at atmospheric, sub-atmospheric, or super-atmospheric pressures. The pressure at which polymerization is carried out is not critical and persons familiar with cationic polymerization techniques will know the desirable pressures for effecting polymerization.

After polymerization has been carried out for a time sufficient to copolymerize the monomers, the copolymer product may be separated from the reaction mixture and purified in the following manner. The reaction mixture is admixed with methanol, ethanol, propanol, or another non-solvent, and the copolymer is collected. The copolymer is then re-dissolved in hexane or an appropriate solvent, and again precipitated with methanol. The resulting composition is a copolymer having a molecular weight from about 1000 to about 200,000, depending largely on the polymerization temperature and the ratio of monomers used. Preferred copolymers will have a molecular weight from about 60,000 to about 70,000.

A distinctly novel feature of the copolymers of the present invention is the pendant labile tetrahydropyranyloxy group extending from the hydrocarbon backbone of the copolymer. This labile group can be readily hydrolyzed to form copolymer derivatives having multi-functional properties. The viscosity index improving hydrolyzed oil-soluble copolymer can be further reacted with functional groups to produce a derivative copolymer having detergency and dispersancy characteristics, rust-inhibiting properties, and anti-oxidation properties, in addition to its viscosity index improving characteristics. For example, the copolymer can be hydrolyzed, with an acid such as sulfuric acid, to a hydrolyzed copolymer containing pendant aldehyde and/or hydroxyl groups, which hydrolyzed copolymer is a satisfactory combination viscosity improving detergent lubricating oil additive. From the pendant aldehyde and hydroxyl groups, numerous functional derivatives of the copolymer, such as oximes, hydrazones, alcohols, amines, alkanolamines, and Schiff bases can be produced.

By reacting the acid hydrolyzed copolymers of this invention with hydroxylamine, oximes are produced. From the oximes, a copolymer having pendant primary amine groups may be produced by reacting the oximes with sodium and alcohol, or by other well-known reactions. The primary amine may then be converted to a secondary or tertiary amine, by replacement of the hydrogen atoms with radicals, such as ethyl, propyl, pentyl, diethyl, dipropyl, methylethyl, ethylpentyl, ethylphenyl, pentylphenyl, or a diphenyl. Secondary and tertiary amines are formed from the primary amine by alkylating the primary amine with an alkyl halide. In particular, the secondary amine is formed by reacting the primary amine with aluminum alkoxides at 250°–350° in a closed chamber. The amine may be reacted with ethylene oxide to form ethanolamine and diethanolamine.

The carbonyl group of the pendant aldehyde may be reacted with hydrazines to form hydrazones. For example, an alkyl hydrazine, dialkyl hydrazine, aryl hydrazine, diaryl hydrazine, or arylalkyl hydrazine may be reacted with the pendant carbonyl group of the copolymer to form derivatives, such as ethyl hydrazone, pentyl hydrazone, octyl hydrazone, diethyl hydrazone, dibutyl hydrazone, dinonyl hydrazone, phenyl hydrazone, diphenyl hydrazone, or phenylethyl hydrazone. In a like manner, the pendant carbonyl group may be reacted with semicarbazides to form semicarbazones, such as ethyl semicarbazone, propyl semicarbazone, heptyl semicarbazone, diethyl semicarbazone, ethyl hexyl semicarbazone, phenyl semicarbazone, diphenyl semicarbazone, ethylphenyl semicarbazone, or decylphenyl semicarbazone.

Another group of copolymer compositions containing pendant functional groups may be made by reducing the pendant aldehyde groups to hydroxyl. Reduction may be accomplished by reacting the hydrolyzed copolymer with zinc and hydrochloric acid, with sodium and alcohol, or other well-known reducing agents, such as lithium aluminum hydride. The resulting pendant hydroxyl groups may be esterified. Pendant esters, such as alkyl, substituted alkyl, aryl, and substituted aryl may be formed. Specific examples of the classes of esters which may be formed are the ethyl, pentyl, dodecyl, and phenyl. By esterifying the hydroxyl group with an amino acid, such as glycine, alanine, valine, phenylalanine, proline, serine, methionine, and histidine, nitrogen-containing pendant esters are formed.

By oxidizing the pendant aldehyde group a carboxylic acid is formed. Oxidizing agents, such as potassium permanganate, acetyl peroxide, or air and a heavy metal catalyst, will accomplish the oxidation. From the carboxylic acids, acyl halides, such as the chloride, bromide, or iodide, may be formed by reacting the acid with the phosphorus trihalide, phosphorus pentahalide, or thionyl halide. From the acid, esters may be prepared by well-known methods, such as the Fischer esterification. Examples of esters which may be formed by esterifying the acid are dimethyl aminoethyl, diethyl aminoethyl and dodecyl aminoethyl. The acids may be converted to amides by reacting the acid with aqueous ammonia to form amide derivatives. Specific amides may be formed by reacting the carboxylic acid with amines, such as tetraethylene pentamine and triethylene tetramine, to form the amide of tetraethylene pentamine and triethylene tetramine.

The herein described copolymers may be used in a base lubricating oil in amounts varying from about 0.1 weight percent to about 20 weight percent. Advantageously, the copolymer is added to the base lubricant in concentrations from about 1 weight percent to about 10 weight percent. A preferred lubricating composition is obtained when a copolymer, having a molecular weight of about 60,000 to about 70,000, is added to a hydrocarbon oil in concentrations of about 1 weight percent to about 5 weight percent.

A utility of the copolymers of the present invention is illustrated through the copolymer's use in a mineral lubricating oil to improve the viscosity index. However, the base oil to which the copolymer may be added is not limited to a mineral oil; synthetic and natural lubricating oils may also be employed as base lubricants.

*Example I*

A copolymer of isobutene and 2-allyloxytetrahydropyran was prepared as follows: A mixture of 1500 ml. (ca. 27 moles) of isobutene and 121 g. (ca. 0.85 mole) of monomer B in ca. 1500 ml. of n-pentane were externally cooled to −40° F. in a flask equipped with a stirrer and a thermometer. $BF_3$ gas was bubbled through the mixture, the mixture stirred with cooling at a rate sufficient to keep the temperature between −40° F. and −25° F., for about 10 minutes. The reaction mixture was poured into methanol. The insoluble polymer was collected, and repeatedly re-dissolved in hexane, and reprecipitated again with methanol four times. A 73 percent yield of a copolymer having a molar ratio of A:B of about 32:1 was obtained with a molecular weight in the range of 60,000–70,000.

*Example II*

A hydrolyzed oil-soluble copolymer of this invention was obtained by dissolving about 15 gms. of the copolymer of Example I in hexane to form a 5 percent solution of the polymer at room temperature. About 200 ml. of 95 percent sulfuric acid was then added to the copolymer solution and held with stirring for about 15 minutes. Thereafter, the mixture was allowed to separate into acid and hydrocarbon layers. After removal of the acid layer, the hydrolyzed copolymer was precipitated by addition of methanol. Impurities were removed from the precipitate by repeatedly (four times) dissolving the polymer in hexane and precipitating with methanol.

A mineral lubricating oil base stock of SAE 10W–30 grade is obtained by the addition of about 2 weight percent of either the copolymer of Example I or the hydrolyzed copolymer of Example II to a 50/50 blend of solvent extracted SAE 5 and SAE 10 grade mineral lubricating oil base stocks. High performance crankcase motor oils can be prepared from the 10W–30 grade oil base stock by the addition thereto of conventional lubricant additives for improving anti-oxidation, anti-wear, and anti-rust properties of such base stocks. Exemplary of such compounded motor oils is the product obtained by the addition of about 6 weight percent of a barium-containing polybutene-$P_2S_5$ reaction product, about 1 weight percent of zinc dialkyldithiophosphate, and about 1 weight percent of calcium petroleum sulfonate to the aforesaid 10W–30 base stock.

We claim:

1. The copolymer consisting essentially of the copolymerization product of polymerizable monomers (A) isobutene and (B) 2-allyloxytetrahydropyran wherein the molar ratio of A:B is 1–100:1; said copolymer having a molecular weight from about 1000 to about 200,000.

2. The hydrolyzed copolymer of claim 1.

3. A lubricating oil containing a minor amount, sufficient to improve the viscosity index of said oil, of an oil-soluble copolymer of claim 1.

4. A lubricating oil containing a minor amount, sufficient to improve the viscosity index of said oil, of a hydrolyzed oil-soluble copolymer of claim 1.

5. The composition of claim 4 wherein the amount of said copolymer is from about 0.1 to about 20 weight percent.

6. A lubricating oil containing from about 0.1 to about 20 weight percent of a hydrolyzed oil-soluble copolymer of claim 1 wherein the molar ratio of A:B is 5–50:1, said hydrolyzed copolymer having a molecular weight of from about 2,000 to about 200,000.

7. The composition of claim 6 wherein the molar ratio of A:B in said copolymer is about 32:1.

8. A mineral lubricating oil containing about 2 weight percent of a hydrolyzed oil-soluble copolymer of claim 1 wherein the molar ratio of A:B is about 32:1, said copolymer having a molecular weight from about 60,000 to about 70,000.

9. The composition of claim 8 further including about 6 weight percent barium-containing $P_2S_5$-polybutene reaction product, about 1 weight percent dialkyldithiophosphate, and about 1 weight percent calcium petroleum sulfonate.

References Cited by the Examiner

UNITED STATES PATENTS 2,514,168   7/1950   Smith et al. _____ 260—88.1

DANIEL E. WYMAN, *Primary Examiner.*

L. G. XIARHOS, *Assistant Examiner.*